(12) United States Patent
Ord et al.

(10) Patent No.: US 8,506,659 B2
(45) Date of Patent: *Aug. 13, 2013

(54) HYDROGEN GENERATING APPARATUS

(75) Inventors: Jason S. Ord, Portland, OR (US); Justin Roman, Portland, OR (US); Alan Shibata, Camas, WA (US)

(73) Assignee: Eveready Battery Co., Inc., St. Louis, MO (US)

( * ) Notice: Subject to any disclaimer, the term of this patent is extended or adjusted under 35 U.S.C. 154(b) by 1992 days.

This patent is subject to a terminal disclaimer.

(21) Appl. No.: 11/441,533

(22) Filed: May 26, 2006

(65) Prior Publication Data

US 2006/0222911 A1    Oct. 5, 2006

Related U.S. Application Data

(62) Division of application No. 10/177,233, filed on Jun. 21, 2002, now Pat. No. 7,097,813.

(51) Int. Cl.
*C01B 6/24* (2006.01)
*H01M 8/04* (2006.01)
*H01M 8/06* (2006.01)

(52) U.S. Cl.
USPC ............... 48/61; 423/644; 429/421; 429/515

(58) Field of Classification Search
USPC ............................................... 48/61; 429/19
See application file for complete search history.

(56) References Cited

U.S. PATENT DOCUMENTS

| | | | |
|---|---|---|---|
| 3,323,873 A | | 6/1967 | Elmar-Manfred Horn et al. |
| 3,325,880 A | | 6/1967 | Kotler et al. |
| 3,459,510 A | * | 8/1969 | Litz et al. ...................... 422/113 |
| 3,578,415 A | | 5/1971 | Hiltz |
| 5,650,811 A | * | 7/1997 | Seccombe et al. ............... 347/85 |
| 5,865,344 A | * | 2/1999 | Nagel .............................. 222/79 |
| 5,912,688 A | | 6/1999 | Gragg |
| 6,544,400 B2 | | 4/2003 | Hockaday et al. |
| 2001/0045364 A1 | * | 11/2001 | Hockaday et al. ............ 205/338 |
| 2003/0009942 A1 | | 1/2003 | Amendola et al. |

FOREIGN PATENT DOCUMENTS

| | | |
|---|---|---|
| DE | 1667346 | 6/1971 |
| FR | 2807745 | 4/2000 |
| WO | WO-01/51410 A1 | 7/2001 |
| WO | WO-01/74710 A1 | 10/2001 |
| WO | WO-02/30810 A1 | 4/2002 |

\* cited by examiner

*Primary Examiner* — Melvin C Mayes
*Assistant Examiner* — Colin W Slifka
(74) *Attorney, Agent, or Firm* — Russell H. Toye, Jr.

(57) ABSTRACT

A hydrogen generating apparatus includes a chemical reaction chamber, a chemical solution reservoir, and an unpowered pressure producing member for moving a chemical solution from the chemical solution reservoir to the chemical reaction chamber.

31 Claims, 12 Drawing Sheets

HYDROGEN GENERATING APPARATUS

CROSS REFERENCE TO RELATED APPLICATIONS

This application is a Divisional of U.S. application Ser. No. 10/177,233, filed on Jun. 21, 2002, now U.S. Pat. No. 7,097,813, and entitled Hydrogen Generating Apparatus.

FIELD OF THE INVENTION

This invention relates to fuel cells. More particularly, this invention relates a method and apparatus for hydrogen generation for a fuel cell.

BACKGROUND OF THE INVENTION

Over the past century the demand for energy has grown exponentially. With the growing demand for energy, many different energy sources have been explored and developed. One of the primary sources for energy has been and continues to be the combustion of hydrocarbons. However, the combustion of hydrocarbons usually results in incomplete combustion and non-combustibles that contribute to smog and other pollutants in varying amounts.

As a result of the pollutants created by the combustion of hydrocarbons, the desire for cleaner energy sources has increased in more recent years. With the increased interest in cleaner energy sources, fuel cells have become more popular and more sophisticated. Research and development on fuel cells has continued to the point where many speculate that fuel cells will soon compete with the gas turbine generating large amounts of electricity for cities, the internal combustion engine powering automobiles, and batteries that run a variety of small and large electronics.

Fuel cells conduct an electrochemical energy conversion of hydrogen and oxygen into electricity and heat. Fuel cells are similar to batteries, but they can be "recharged" while providing power.

Fuel cells provide a DC (direct current) voltage that may be used to power motors, lights, or any number of electrical appliances. There are several different types of fuel cells, each using a different chemistry. Fuel cells are usually classified by the type of electrolyte used. The fuel cell types are generally categorized into one of five groups: proton exchange membrane (PEM) fuel cells, alkaline fuel cells (AFC), phosphoric-acid fuel cells (PAFC), solid oxide fuel cells (SOFC), and molten carbonate fuel cells (MCFC).

PEM Fuel Cells

Figure 1:
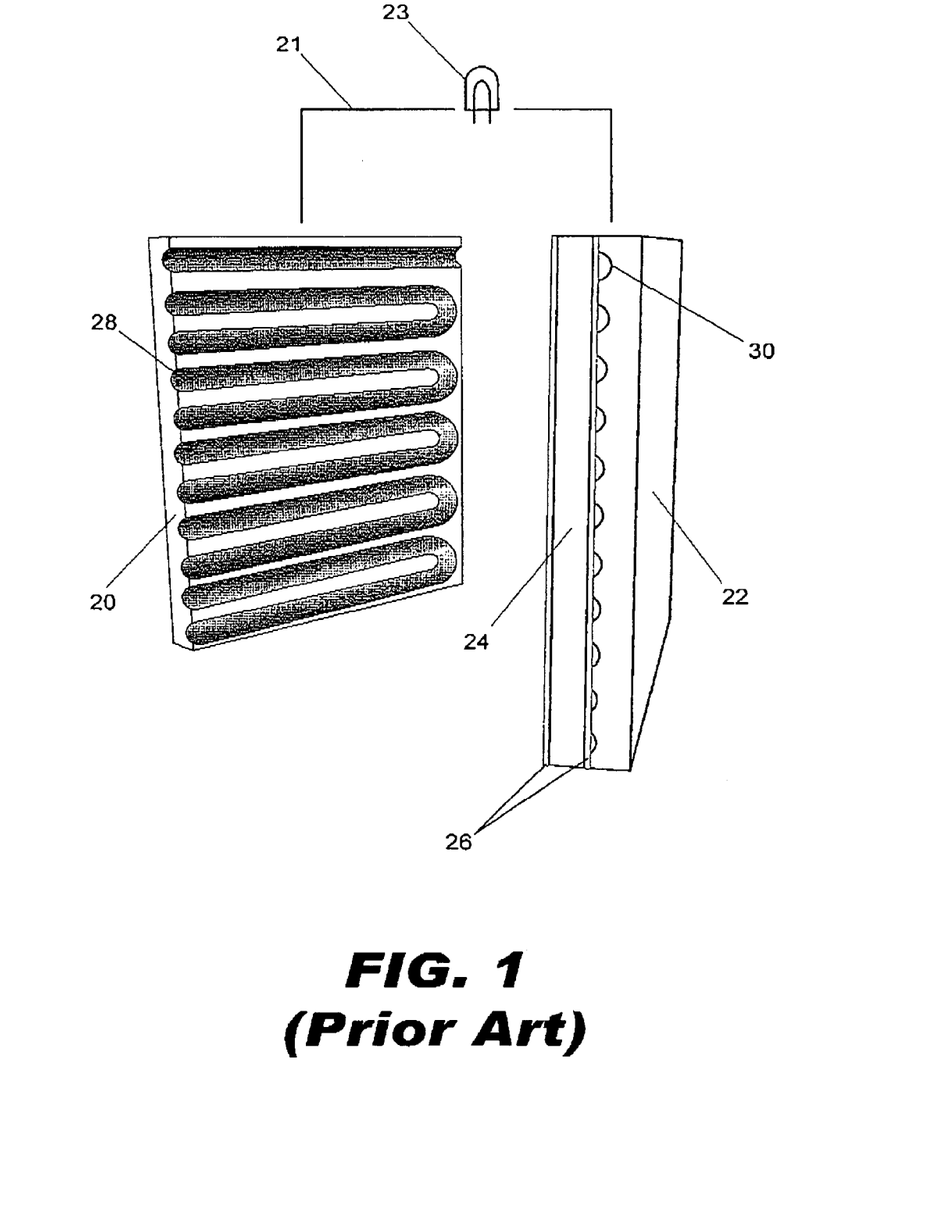
FIG. 1 is an unassembled perspective view of a PEM fuel cell apparatus.

The PEM fuel cells are currently believed to be the most promising fuel cell technology, and use one of the simplest reactions of any fuel cell. Referring to FIG. 1, a PEM fuel cell will typically include four basic elements: an anode (20), a cathode (22), an electrolyte (PEM) (24), and a catalyst (26) arranged on each side of the electrolyte (24).

The anode (20) is the negative post of the fuel cell and conducts electrons that are freed from hydrogen molecules such that the electrons can be used in an external circuit (21). The anode (20) includes channels (28) etched therein to disperse the hydrogen gas as evenly as possible over the surface of the catalyst (26).

The cathode (22) is the positive post of the fuel cell, and has channels (30) etched therein to evenly distribute oxygen (usually air) to the surface of the catalyst (26). The cathode (22) also conducts the electrons back from the external circuit to the catalyst, where they can recombine with the hydrogen ions and oxygen to form water. Water is the only by-product of the PEM fuel cell.

The electrolyte (24) is the proton exchange membrane (PEM) (24). The PEM is a specially treated porous material that conducts only positively charged ions. The PEM (24) prevents the passage of electrons.

The catalyst (26) is typically a platinum powder thinly coated onto carbon paper or cloth. The catalyst (26) is usually rough and porous so as to maximize the surface area of the platinum that can be exposed to the hydrogen or oxygen. The catalyst (26) facilitates the reaction of oxygen and hydrogen.

In a working fuel cell, the PEM (24) is sandwiched between the anode (20) and the cathode (22). The operation of the fuel cell can be described generally as follows. Pressurized hydrogen gas ($H_2$) enters the fuel cell on the anode (20) side. When an $H_2$ molecule comes into contact with the platinum on the catalyst (26), it splits into two $H^+$ ions and two electrons ($e^-$). The electrons are conducted through the anode (20), where they make their way through the external circuit (21) that may be providing power to do useful work (such as turning a motor or lighting a bulb (23)) and return to the cathode side of the fuel cell.

Meanwhile, on the cathode (22) side of the fuel cell, oxygen gas ($O_2$) is being forced through the catalyst (26). In some PEM fuel cell systems the $O_2$ source may be air. As $O_2$ is forced through the catalyst (26), it forms two oxygen atoms, each having a strong negative charge. This negative charge attracts the two $H^+$ ions through the PEM (24), where they combine with an oxygen atom and two of the electrons from the external circuit to form a water molecule ($H_2O$).

The PEM fuel cell reaction just described produces only about 0.7 volts, therefore, to raise the voltage to a more useful level, many separate fuel cells are often combined to form a fuel cell stack.

PEM fuel cells typically operate at fairly low temperatures (about 80° C./176° F.), which allows them to warm up quickly and to be housed in inexpensive containment structures because they do not need any special materials capable of withstanding the high temperatures normally associated with electricity production.

Hydrogen Generation for Fuel Cells

As discussed above, each of the fuel cells described uses oxygen and hydrogen to produce electricity. The oxygen required for a fuel cell is usually supplied by the air. In fact, for the PEM fuel cell, ordinary air at ambient conditions is pumped into the cathode. However, hydrogen is not as readily available as oxygen.

Hydrogen is difficult to generate, store and distribute. One common method for producing hydrogen for fuel cells is the use of a reformer. A reformer uses hydrocarbons or alcohol fuels to produce hydrogen, which is then fed to the fuel cell. Unfortunately, reformers are problematic. If the hydrocarbon fuel is gasoline or some of the other common hydrocarbons, $SO_x$, $NO_x$ and other undesirable products are created. Sulfur, in particular, must be removed or it can damage the electrode catalyst. Reformers usually operate at high temperatures as well, which consumes much of the energy of the feedstock material.

Hydrogen may also be created by low temperature chemical reactions utilizing a fuel source in the presence of a catalyst. However, many problems are associated with low temperature chemical reactions for producing hydrogen. One of the primary problems is the requirement for pumps to move the chemical mixture into a reaction chamber filled with a catalytic agent. The use of a pump consumes at least some of the power that the fuel cell is generating (called parasitic power). If the power consumed by the pump becomes too high, the operation of the fuel cell to produce electricity becomes uneconomical.

Further, the chemical mixture provided to the reaction chamber must be accurately metered to facilitate a chemical reaction that will efficiently generate electric power. Accurate metering equipment adds expense, complexity, and sensitivity to the pumping system and increases the parasitic power consumption. Typical fuel cells are also usually orientation-specific, meaning that metering of the chemical mixture can only be done when the fuel cell is in certain orientations. Orientation-specific fuel cell systems limit their usefulness for portable consumer electronics and other devices that may be used in multiple and changing orientations.

In addition, another challenge to using fuel cells in portable consumer products such as digital cameras and laptop computers is providing a hydrogen fuel source that is safe and energy-dense. While there have been fuel cell systems used to generate electricity, such as the PEM fuel cell described above, they are typically not small or dense enough to be used in most portable consumer products.

SUMMARY OF THE INVENTION

The present invention provides, among other things, a hydrogen generating apparatus including a chemical reaction chamber, a chemical solution reservoir, and an unpowered pressure producing member for moving a chemical solution from the chemical solution reservoir to the chemical reaction chamber.

BRIEF DESCRIPTION OF THE DRAWINGS

The foregoing and other features and aspects of the invention will become further apparent upon reading the following detailed description and upon reference to the drawings in which.

In the drawings, identical reference numbers indicate similar, but not necessarily identical, elements. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF ILLUSTRATED EMBODIMENTS

Illustrative embodiments of the invention are described below. As will be appreciated by those skilled in the art, the present invention can be implemented in a wide variety of chemical reactions especially those for producing hydrogen for fuel cells. The fuel cell applications include, but are not limited to, PEM fuel cells, AFCs, PAFCs, SOFCs, and MCFCs.

Figure 2:
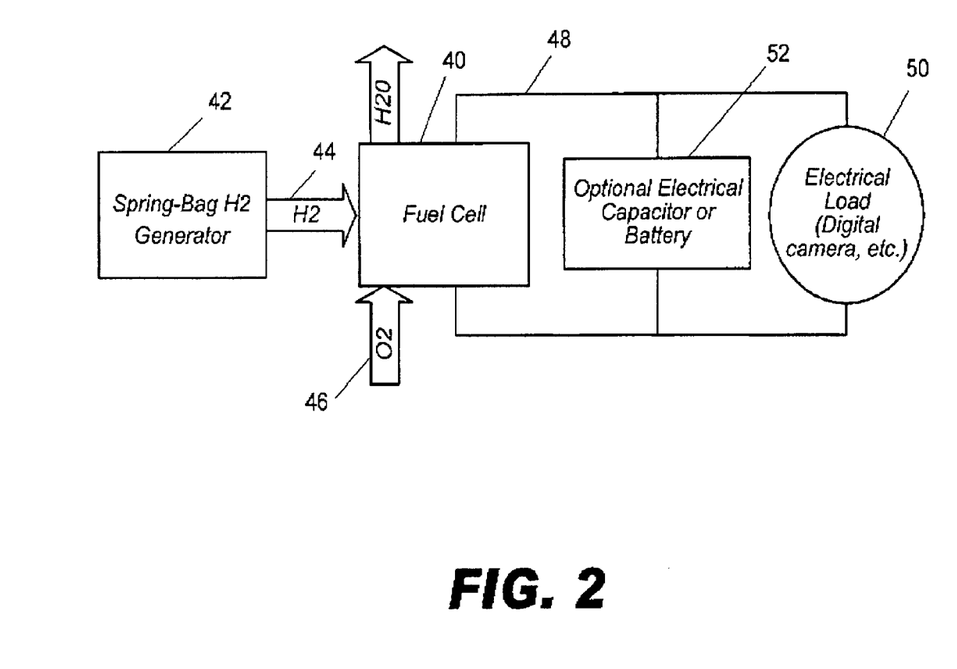
FIG. 2 is an overview diagram of a fuel cell apparatus according to one embodiment of the present invention.

Turning now to the figures, and in particular to FIG. 2, an overview of a fuel cell system according to one embodiment of the present invention is shown. According to the embodiment of FIG. 2, there is a fuel cell (40) in fluid communication with a hydrogen generating apparatus (42). The hydrogen generating apparatus (42) may provide a supply of hydrogen gas along the path represented by an arrow (44). A supply of oxygen, that may be provided by ambient air, may also be in fluid communication with the fuel cell (40) as represented by another arrow (46).

The fuel cell (40) may provide power via an external circuit (48) to an electrical load (50). An electrical load may encompass any electrically operated device including, but not limited to, a digital camera, a laptop computer, and other portable electronics. The external circuit (48) may also be connected to an optional electrical capacitor or battery (52) which is shown in electrical parallel with the fuel cell (40) for providing auxiliary power to the electrical load (50).

Figure 3:
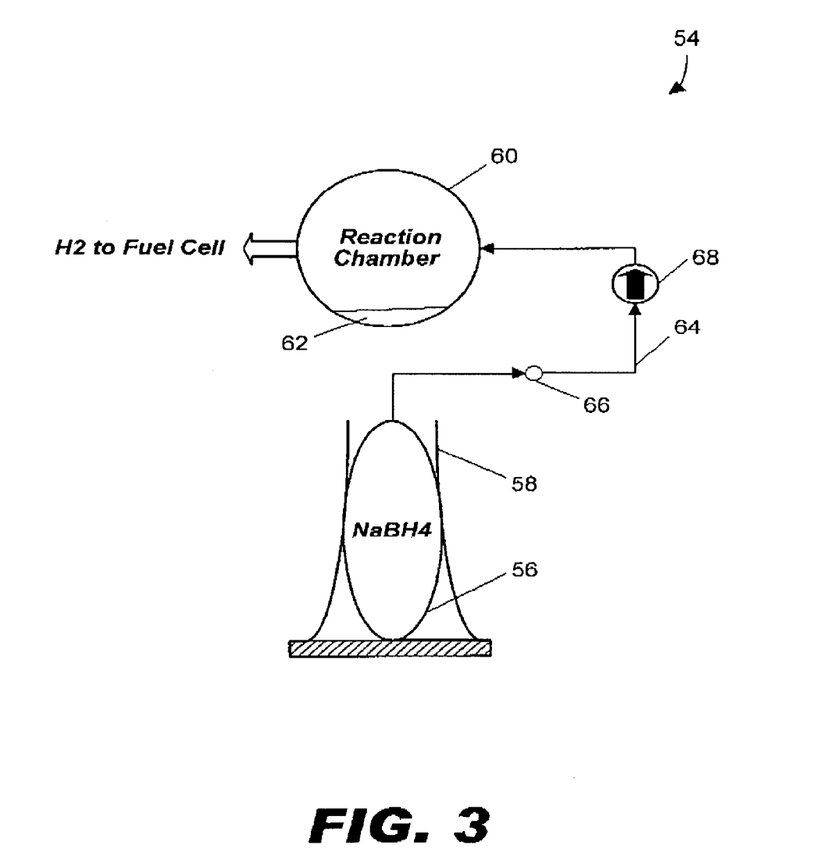
FIG. 3 is a diagrammatical view of hydrogen generator according to one embodiment of the present invention.

The hydrogen generating apparatus (42) is necessary for providing hydrogen gas to the fuel cell (40) so as to drive an energy-producing chemical reaction within the fuel cell (40). The hydrogen generating apparatus (42) may take many different forms. Referring to FIG. 3, one possible embodiment of a hydrogen generating apparatus (54) according to the present invention is shown. According to the embodiment of FIG. 3, the hydrogen generating apparatus (54) includes a chemical solution reservoir, shown in the present embodiment as a fresh solution bag (56) containing a supply of hydrogen-bearing fuel. The hydrogen-bearing fuel may include, but is not limited to, an aqueous metal hydride such as sodium borohydride, and an amine borane, each of which produce hydrogen gas. The fresh solution bag (56) is preferably a flexible bag made of plastics, elastomers, or other materials that are generally deformable and capable of containing fluid solutions.

Arranged about the fresh solution bag (56) may be an unpowered pressure producing member, for example a spring (58) located adjacent to the fresh solution bag (56). The term "unpowered" signifies that the pressure producing member does not consume electrical energy to operate, nor does it require power from a motor. The spring (58) may include one or more members biased toward the fresh solution bag (56) to increase the pressure of the hydrogen-bearing fuel contained inside the fresh solution bag (56). The pressurization of the hydrogen-bearing fuel facilitates movement of the hydrogen-bearing fuel from the fresh solution bag (56) to a chemical reaction chamber (60). The spring (58) and fresh solution bag (56) may constitute a "spring-bag," i.e., a flexible bag or container for containing a chemical solution on which pressure is exerted by a mechanical pressure producing member, for example, a spring or other biasing member, to help expel the chemical solution.

The chemical reaction chamber (60) may be separate from the fresh solution bag (56) and designed to house a chemical reaction that produces hydrogen gas. The chemical reaction chamber (60) may include a wide variety of materials according to the reactants used to produce the hydrogen gas. The chemical reaction chamber (60) may be flexible or rigid, although in the present embodiment the chemical reaction chamber (60) is rigid. In addition, the chemical reaction chamber (60) may contain a catalyst (62) for increasing the reaction rate of the hydrogen-bearing fuel. The catalyst (62) may include, but is not limited to, a noble metal catalyst such as ruthenium, rhodium, or platinum. The catalyst (62) may include other metals such as nickel.

The movement of the hydrogen-bearing fuel from the fresh solution bag (56) to the chemical reaction chamber (60) may be facilitated by a fluid path such as a tubing (64). In addition, the flow of the hydrogen-bearing fuel from the fresh solution bag (56) to the chemical reaction chamber (60) may be controlled by a valve, such as a micro-valve (66). The micro-valve (66) may be arranged at any convenient location along the tubing (64) for controlling the flow from the fresh solution bag (56). The micro-valve (66) is available from a variety of commercial sources and may be controlled in at least three primary ways. The micro-valve (66) may be controlled by the time between pulses (micro-valve (66) pulsing frequency), the pulse width (duration the micro-valve (66) is held open), and/or variation in aperture size. Variable aperture size control indicates analog control of how far open or closed the micro-valve is. The micro-valve (66) may thus enable precise control of the flow of the hydrogen-bearing fuel into the chemical reaction chamber (60). The micro-valve (66) may be normally closed. Therefore, when hydrogen gas is needed, the micro-valve (66) is opened to allow the hydrogen-bearing fuel, pressurized by the spring (58), to flow into the reaction chamber (60). An optional check valve (68) may also be included. In the embodiment shown, the check valve (68) is located downstream of the micro-valve (66), but this is not necessarily so. Check valve (68) may be inserted at any point along the tubing (64). Check valve (68) is commercially available from a number of different sources and is a one-way valve. Thus, check valve (68) prevents the backflow of products or of the hydrogen-bearing fuel in the event of a pressure build up in the chemical reaction chamber (60).

Operation of the hydrogen generating apparatus (54) may be described as follows. A hydrogen-bearing fuel source such as sodium borohydride is inserted into the fresh solution bag (56). In some embodiments, the fresh solution bag (56) may be inserted separately against the spring (58) after being filled. Alternatively, the fresh solution bag (56) may be filled while in the arrangement shown in FIG. 3. The spring (58) is arranged adjacent to and biased toward the fresh solution bag (56) and therefore pressurizes the sodium borohydride contained by the fresh solution bag (56). When hydrogen gas is needed by a fuel cell to provide an electrical current, the micro-valve (66) may be opened or oscillated to allow pressurized sodium borohydride to move from the fresh solution bag (56) to the chemical reaction chamber (60). When the sodium borohydride enters the chemical reaction chamber (60) and encounters the catalyst (62), hydrogen gas is released from the sodium borohydride solution. The hydrogen gas released from the sodium borohydride solution may then be supplied to a fuel cell such as the fuel cell apparatus of FIGS. 1 and 2.

Prior hydrogen generating apparatus require pumps of one kind or another to move the supply of hydrogen-bearing fuel from a reservoir to a reaction chamber. As indicated as above, pumps add significantly to the parasitic losses of a fuel cell apparatus and occupy space, limiting the energy density available for the fuel cell apparatus. Advantageously, the present invention decreases parasitic loss and reduces space requirements by providing a mechanical pressure source to facilitate movement of the hydrogen-bearing fuel from a reservoir to a reaction chamber.

Figure 4A:
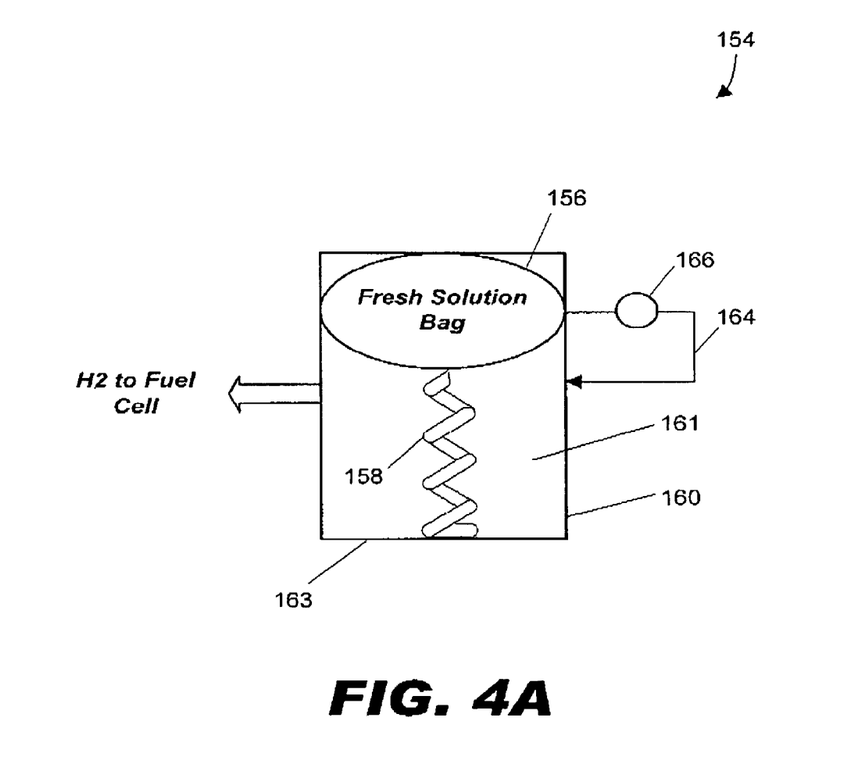
FIG. 4A is a diagrammatical view of a hydrogen generator according to another embodiment of the present invention.

Referring next to FIG. 4A, another embodiment of a hydrogen generating apparatus (154) according to the present invention is shown. Similar to the embodiment of FIG. 3, the hydrogen generating apparatus (154) of FIG. 4A may include a chemical solution reservoir such as a fresh solution bag (156) and a chemical reaction chamber (160). However, according to the embodiment of FIG. 4A, the fresh solution bag (156) may be entirely contained by the chemical reaction chamber (160). One advantage of such an arrangement is the conservation of space and an increased energy density. The fresh solution bag (156) is generally flexible and therefore as the supply of hydrogen-bearing fuel (and the volume of the fresh solution bag (156)) decreases, the portion (161) of the chemical reaction chamber (160) dedicated to conducting the chemical reaction increases. The chemical reaction chamber (160), as opposed to the fresh solution bag (156), may be a rigid structure and may contain a catalyst. The arrangement of FIG. 4A is a space-efficient configuration that eliminates any duplicate volume.

In addition to being space-efficient, the configuration of FIG. 4A includes an arrangement of the fresh solution bag (156) within the chemical reaction chamber (160) such that fresh solution bag (156) is exposed to the pressure of the chemical reaction chamber (160). Therefore, as the chemical reaction chamber (160) pressurizes during operation, the pressure transfers to the fresh solution bag (156) and a very low-force pressure producing member may be used to initiate flow from the fresh solution bag (156) to the chemical reaction chamber (160) at any chemical reaction chamber (160) pressure. Accordingly, because the fresh solution bag (156) is always exposed to the chemical reaction chamber (160) pressure, the low-force pressurizing member may be low-force and light-weight. In the present embodiment the low-force pressurizing member is a light-weight coiled spring (158). Further, the chemical reaction chamber (160) which contains the fresh solution bag (156) may be light-weight and smaller than a conventional reactor because it does not need to be large and stiff enough to handle high force (and therefore a larger) spring.

The coiled spring (158) of the present embodiment is disposed inside the chemical reaction chamber (160) between a wall (163) of the chemical reaction chamber (160) and the fresh solution bag (156) or a member abutting the solution bag (156). Accordingly, the coiled spring (158) applies a force to the fresh solution bag (156) and increases the pressure on the fluid contained in the fresh solution bag (156) enough to move fluid from the fresh solution bag into the chemical reaction chamber (160). The combination of a flexible bag and a spring constitutes a spring-bag, as defined herein.

A fluid communication path (164) provides a path for the solution or fuel from the bag (156) to enter the reaction chamber (160). According to the embodiment shown in FIG. 4A, the fluid communication path (164) is external to the reaction chamber (160) and runs between the fresh solution bag (156) and that portion (161) of the chemical reaction chamber (160) dedicated to conducting the chemical reaction, but this is not necessarily so. The fluid communication path (164) may also be contained entirely within the chemical reaction chamber (160). As with the embodiment shown in FIG. 3, the fluid communication path (164) includes a valve such as a micro-valve (166) to meter fluid flow from the fresh solution bag (156) to the portion (161) of the chemical reaction chamber (160) dedicated to conducting the chemical reaction.

Operation of the hydrogen generating apparatus (154) shown in FIG. 4A may be described as follows. A hydrogen-bearing fuel source such as sodium borohydride is inserted into the fresh solution bag (156). The filled fresh solution bag (156) may be inserted separately against the coiled spring (158) in some embodiments, or the fresh solution bag (156) may be filled while in the arrangement shown in FIG. 4A. When the fresh solution bag (156) is filled with an aqueous solution of sodium borohydride or other fuel, it occupies a significant portion of the volume defined by the chemical reaction chamber (160). The coiled spring (158) is arranged adjacent to, and is compressed against, the fresh solution bag (156). Therefore, the coiled spring (158) pressurizes the sodium borohydride contained by the fresh solution bag (156). The potential energy stored in the coiled spring (158) (when compressed) provides chemical solution-moving power without adding to parasitic losses in the way that pumps of prior hydrogen-generating systems do.

When hydrogen gas is needed by a fuel cell to provide an electrical current, the micro-valve (166) may be opened or oscillated to allow pressurized sodium borohydride to move from the fresh solution bag (156) to the portion (161) of the chemical reaction chamber (160) available for chemical reaction. When the sodium borohydride enters the portion (161) of the chemical reaction chamber (160) available for chemical reaction and encounters a catalyst (not shown), hydrogen gas is released from the aqueous sodium borohydride solution. The hydrogen gas released from the aqueous sodium borohydride solution may then be supplied to a fuel cell such as the fuel cell apparatus shown in FIGS. 1 and 2. As the supply of aqueous sodium borohydride solution is consumed, the fresh solution bag (156), which is flexible, reduces in volume and provides more volume within the chemical reaction chamber (160) for conducting the chemical reaction.

Figure 4B:
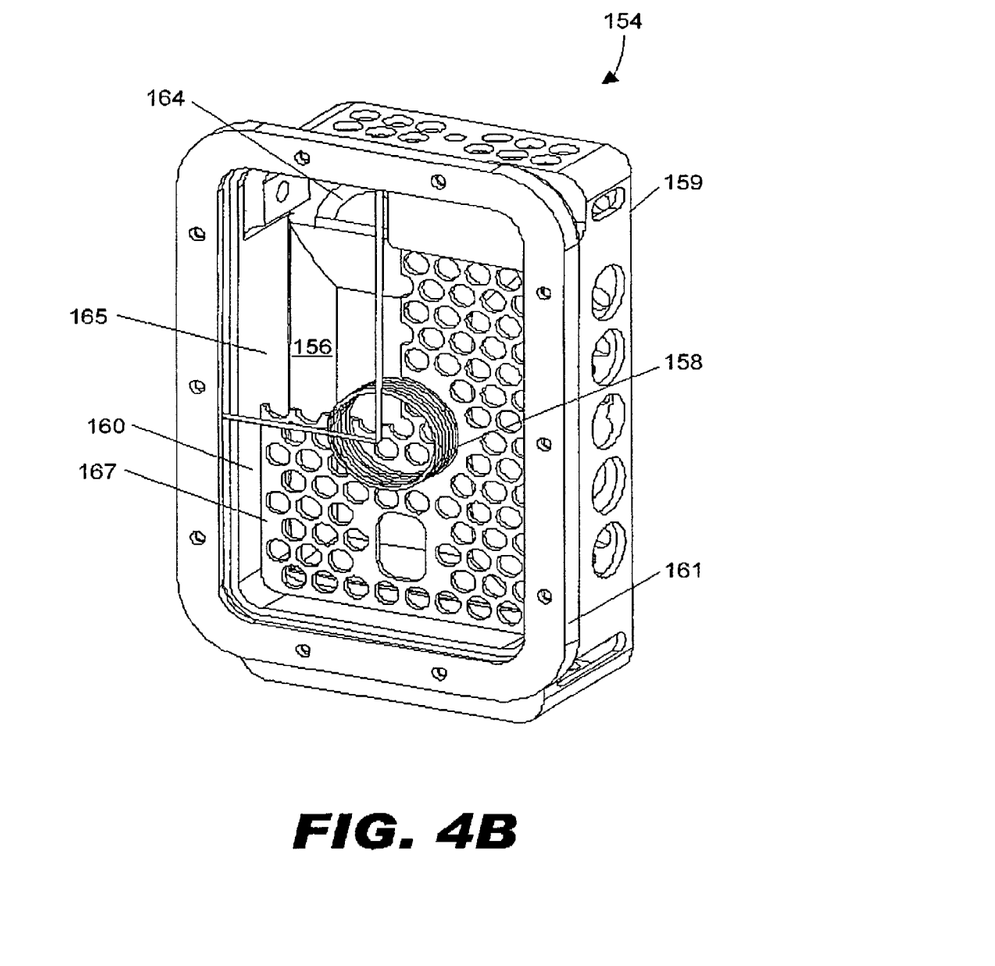
FIG. 4B is a perspective view of a hydrogen generator implementation according to the embodiment of FIG. 4A.
Figure 4C:
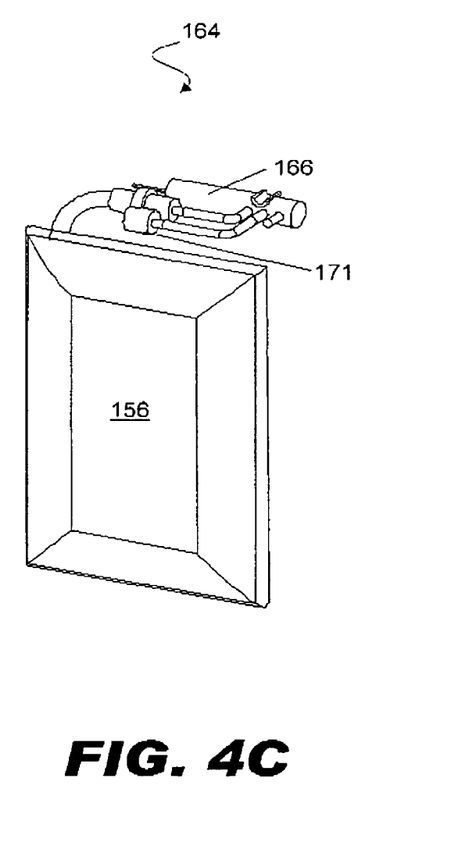
FIG. 4C is a perspective view of some of the internal components of the hydrogen generator implementation according to the embodiment of FIG. 4B.

Referring next to FIG. 4B, an actual implementation according to the embodiment of FIG. 4A is shown. According to the embodiment of FIG. 4B, the hydrogen generating apparatus (154) includes a frame (159) and a window (161) (which is shown with a cut-away portion (165)) form the chemical reaction chamber (160). A baffled pressure plate (167) is disposed within the reaction chamber (160) and the spring (158) is arranged between the window (161) and the baffled pressure plate (167). The fresh solution bag (156) is disposed opposite of the spring (158) and adjacent to the baffled pressure plate (167). The fluid communication path (164) extends from the fresh solution bag (156) and is contained in the present embodiment entirely within the chemical reaction chamber (160). The fluid communication path (164) and associated components can be more clearly seen with reference to FIG. 4C. The micro-valve (166) is arranged along the fluid communication path (164) with an outlet orifice (171), which allows fluids that travel through the micro-valve (166) to enter into the chemical reaction chamber (160) in a controlled manner.

Figure 5:
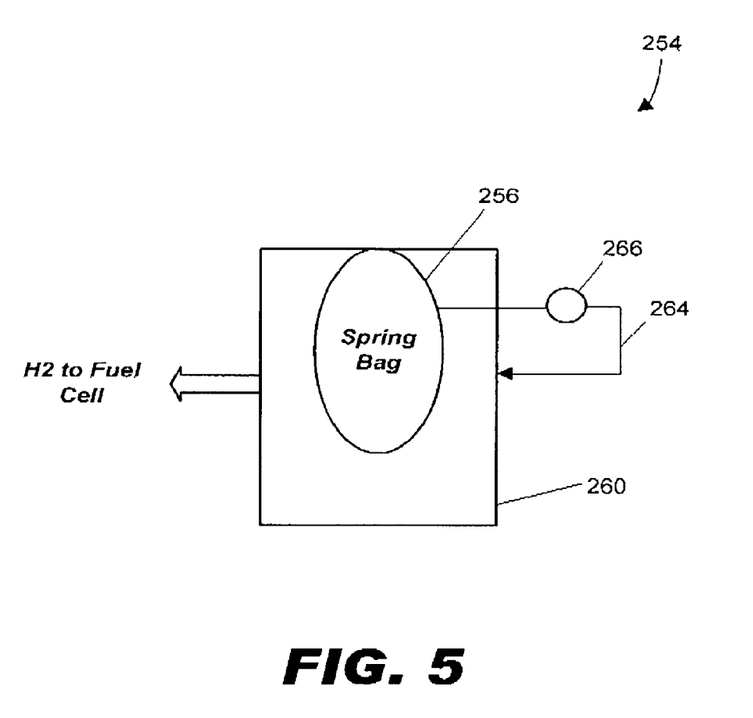
FIG. 5 is a diagrammatical view of a hydrogen generator according to another embodiment of the present invention.

Referring next to FIG. 5, another embodiment of a hydrogen generating apparatus (254) according to the present invention is shown. Similar to the embodiment of FIG. 4, the embodiment of FIG. 5 includes a chemical solution reservoir shown as a flexible fresh solution bag (256), contained within a chemical reaction chamber (260). The flexible fresh solution bag (256) may also be considered a spring-bag as defined herein. According to the embodiment of FIG. 5, the pressure producing member is the spring-bag (256) itself. The flexible bag (256) is preferably made of elastomers such as rubber or other materials that provide a bias or mechanical spring-like force toward a particular shape or volume. Thus, the material exerts a pressure on any fluid contained therein when expanded under pressure to contain that fluid against the natural bias for a smaller shape or volume. Therefore, the spring-bag (256) may operate similarly or identically to the embodiment of FIG. 4, however, the coiled spring (158, FIG. 4) is not necessary for the embodiment of FIG. 5. Instead of a coiled spring, the spring-bag (256) is provided with a chemical solution such as aqueous sodium borohydride such that the spring-bag (256) is expanded. Normally, the expansion will be within the elastic limits of the spring-bag (256). The expansion of the spring-bag (256) provides a pressurizing force on the chemical solution contained by the spring-bag (256) in much the same way a balloon may hold a volume of air under pressure.

A fluid communication path (264) facilitates the transfer of the chemical solution (such as aqueous sodium borohydride) from the spring-bag (256) to the reaction occurring in the chemical reaction chamber (260). The fluid communication path (264) may be at least partially external to the chemical reaction chamber (260), as shown, or the fluid communication path (264) may be internal to the chemical reaction chamber (260). The chemical reaction chamber (260) may be flexible or rigid, and may also contain a catalyst for increasing the rate of reaction of the chemical solution. The fluid communication path (264) may also include a control valve such as micro-valve (266) to meter the chemical solution from the spring-bag (256) to the reaction within the chemical reaction chamber (260). Similar to the embodiment shown in FIG. 4, as the supply of aqueous sodium borohydride is transferred from the spring-bag (256) to the chemical reaction chamber (260), the volume of the spring-bag (256) decreases. As the volume of the spring-bag (256) decreases, more of the chemical reactor chamber (260) volume may be used for conducting the chemical reaction. Hydrogen produced from the reaction in the chemical reaction chamber (260) may be provided to an anode of a fuel cell apparatus such as the apparatus described with reference to FIGS. 1 and 2.

Figure 6:
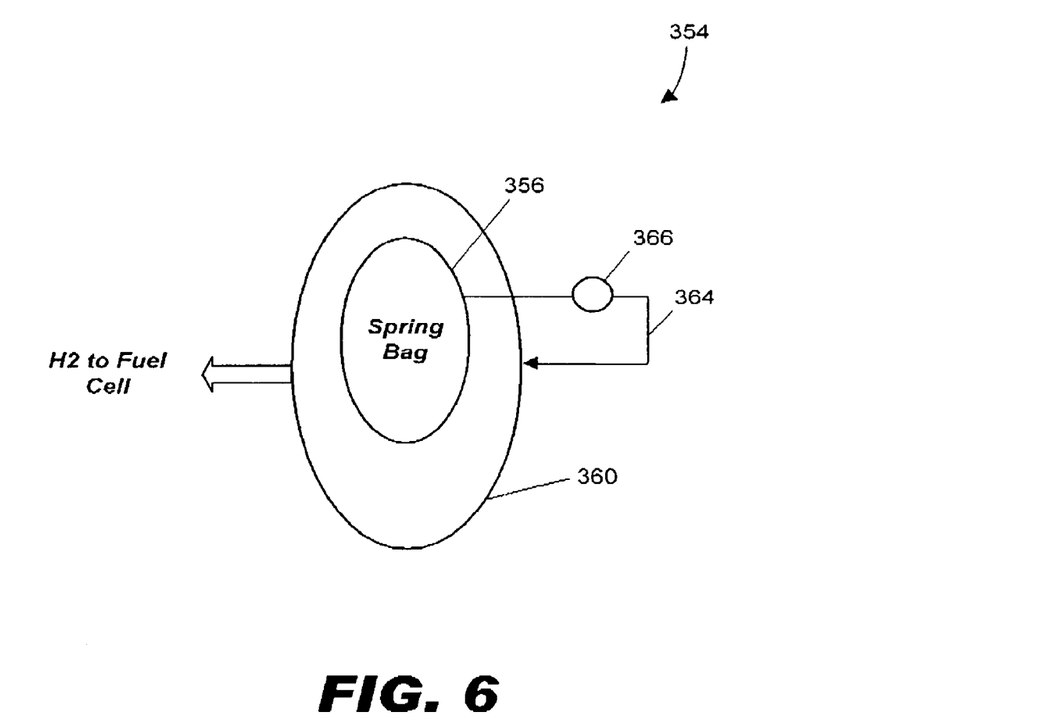
FIG. 6 is a diagrammatical view of a hydrogen generator according to another embodiment of the present invention.

Referring next to FIG. 6, another embodiment of a hydrogen generating apparatus (354) is shown. The embodiment of FIG. 6 is similar to that shown in FIG. 5, however, according to the embodiment of FIG. 6, the chemical reaction chamber is a flexible reaction bag (360). A spring-bag (356) may be disposed within the flexible reaction bag (360) and provide pressure to any hydrogen-bearing fuel solution (such as sodium borohydride) contained therein. As described above, the spring-bag (356) may provide pressure when it is elastically expanded as it is filled with a hydrogen-bearing fuel solution. The spring-bag (356) may be free floating within the flexible reaction bag (360), or is may be attached to the flexible reaction bag (360).

A fluid communication path (364) facilitates the transfer of the hydrogen-bearing chemical solution (such as aqueous sodium borohydride) from the spring-bag (356) to the flexible reaction bag (360). The fluid communication path (364) may be at least partially external to the flexible reaction bag (360) as shown, or the fluid communication path (364) may be entirely internal to the flexible reaction bag (360). The flexible reaction bag (360) may contain a catalyst for increasing the rate of reaction of the hydrogen-bearing fuel solution. The fluid communication path (364) may also include a control valve such as micro-valve (366) to meter the hydrogen-bearing fuel solution from the spring-bag (356) to the flexible reaction bag (360). Similar to the embodiments shown in FIGS. 4 and 5, as the supply of hydrogen-bearing solution such as aqueous sodium borohydride is transferred from the spring-bag (356) to the flexible reaction bag (360), the volume of the spring-bag (356) decreases. As the volume of the spring-bag (356) decreases, more of the flexible reaction bag (360) volume may be used for conducting the chemical reaction. Further, the volume of the flexible reaction bag (360) may increase as the supply of hydrogen-bearing solution enters. The flexible reaction bag may also act as an expanding waste reservoir housing the remaining products following the chemical reaction to produce hydrogen gas. The embodiment of FIG. 6 as described herein may be, particularly lightweight as compared to conventional hydrogen generating systems.

Figure 7:
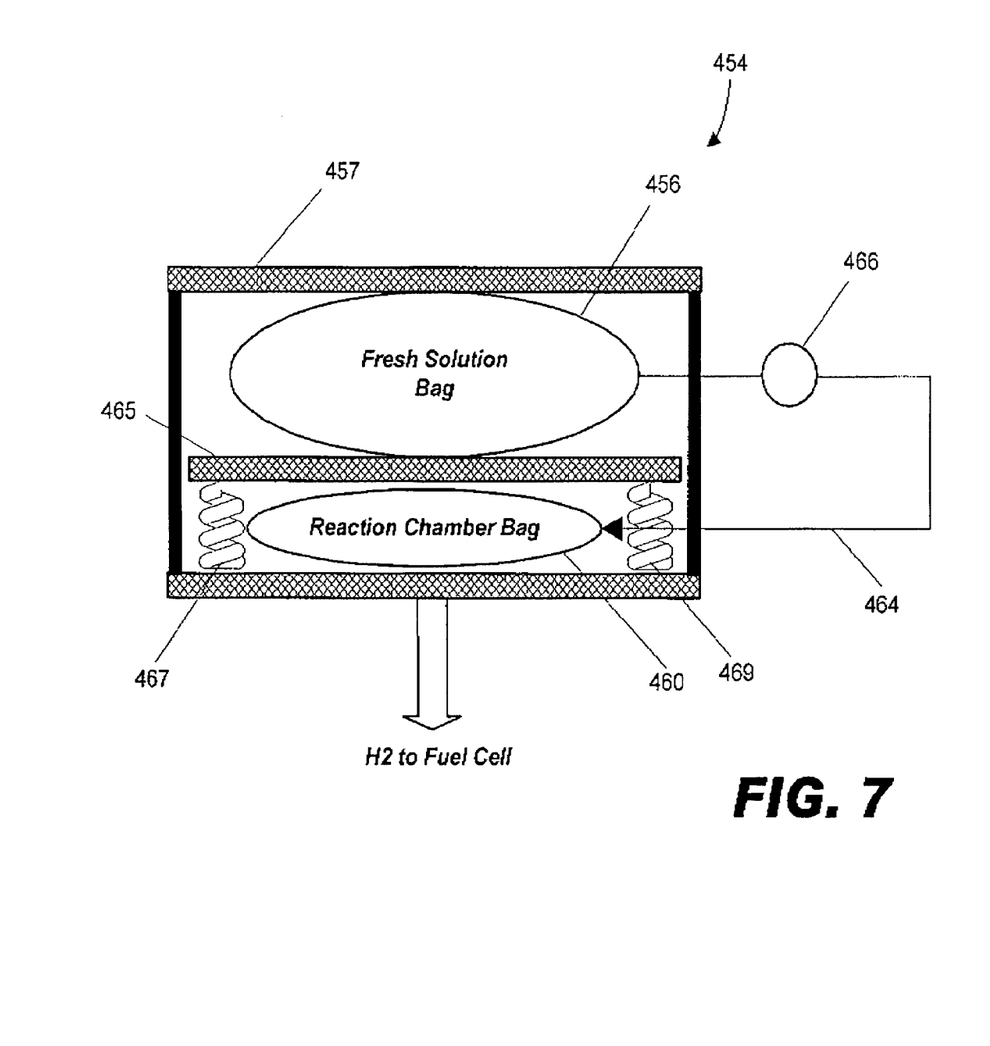
FIG. 7 is a diagrammatical view of a hydrogen generator according to another embodiment of the present invention.

Referring next to FIG. 7, another embodiment of a hydrogen generating apparatus (454) for a fuel cell is shown. According to the embodiment of FIG. 7, the hydrogen generating apparatus (454) includes a chemical solution reservoir embodied as a fresh solution bag (456), and a chemical reaction chamber embodied as a reaction chamber bag (460). The fresh solution bag (456) may contain a hydrogen-bearing fuel solution such as aqueous sodium borohydride, and the reaction chamber bag (460) may contain a catalyst (not shown). Both the fresh solution bag (456) and the reaction chamber bag (460) may be flexibly contained by a rigid frame (457). Advantageously, the rigid frame (457) need not be fluid-tight and resistant to fluid corrosion as prior hydrogen generating systems require, which simplifies the structure of the rigid frame (457) and enables the use of less expensive and lighter-weight materials. The reaction chamber bag (460) may prevent the hydrogen-bearing solution from collecting in corners and crevices that may be present inside a rigid shell reaction chamber such as that embodied in FIGS. 3 and 4.

The fresh solution bag (456) and the reaction chamber bag (460) may be separated from one another by a pressure plate (465). The pressure plate (465) may be a pressure producing member adjacent to and abutting the fresh solution bag (456) and/or the reaction chamber bag (460). One or more biasing members, for example first and second coiled springs (467 and 469), provide a force on the pressure plate (465). The force provided by the first and second coiled springs (467 and 469) is transferred to the fresh solution bag (456) via the pressure plate (465) to increase the pressure on the hydrogen-bearing solution in the solution bag (456).

A fluid communication path (464) facilitates the transfer of the hydrogen-bearing chemical solution (such as aqueous sodium borohydride) from the fresh-solution bag (456) to the reaction chamber bag (460). The fluid communication path (464) may be at least partially external to the rigid frame (457) as shown, or the fluid communication path (464) may be entirely internal to the rigid frame (457). The reaction chamber bag (460) may contain a catalyst for increasing the rate of reaction of the hydrogen-bearing fuel solution. The fluid communication path (464) may also include a control valve such as a micro-valve (466) to meter the hydrogen-bearing fuel solution from the fresh solution bag (456) to the reaction chamber bag (460). As the supply hydrogen-bearing solution such as aqueous sodium borohydride is transferred from the fresh solution bag (456) to the reaction chamber bag (460), the pressure plate (465) displaces toward the fresh solution bag (456) and will decrease the volume of the fresh solution bag (456) and increase the reaction chamber bag (460). The reaction chamber bag (460) may therefore also be termed a waste reservoir for collection products after the reaction to produce hydrogen has completed. Alternatively, an additional waste reservoir similar or identical to the reaction chamber bag (460) may be included internal or external to the rigid frame (457) for collecting waste products. Hydrogen produced in the reaction chamber bag (460) may be provided to an anode of a fuel cell apparatus such as the apparatus described with reference to FIGS. 1 and 2.

Figure 8:
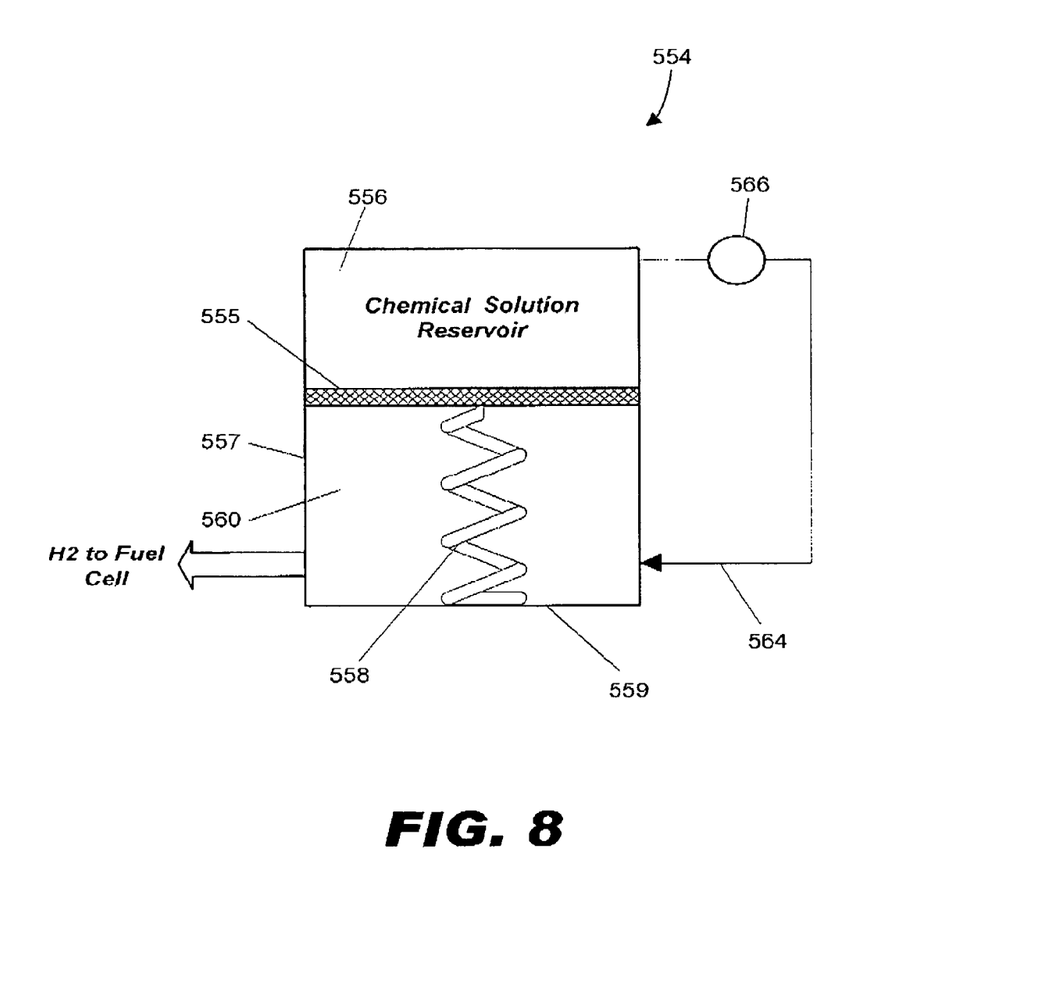
FIG. 8 is a diagrammatical view of a hydrogen generator according to another embodiment of the present invention.

Referring next to FIG. 8, another embodiment of a hydrogen generating apparatus (554) is shown. The hydrogen generating apparatus (554) is shown in a piston-cylinder arrangement. A piston (555) disposed in a cylinder (557) divides the cylinder (557) into a chemical solution reservoir portion (556) and a reaction chamber portion (560). A spring (558) may be disposed between the piston (555) and a wall (559) of the cylinder (557) to provide pressure on the chemical solution reservoir portion (556) of the cylinder (557) and facilitate the movement of a chemical solution such as sodium borohydride from the chemical solution reservoir portion (556) of the cylinder (557) to the reaction chamber portion (560) of the cylinder (557). The spring (558) may also move the piston toward the chemical solution reservoir portion (556) of the cylinder (557). The embodiment of FIG. 8 is particularly space-efficient as it does not use bags which may not completely utilize all space inside of a rigid shell. In addition, the embodiment of FIG. 8 reduces or eliminates any waste solution in the chemical solution reservoir portion (556) of the cylinder (557) that may otherwise be trapped in corners or folds of a bag.

A fluid communication path (564) facilitates the transfer of the chemical solution (such as aqueous sodium borohydride) from the chemical solution reservoir portion (556) of the cylinder (557) to the reaction chamber portion (560) of the cylinder (557). The fluid communication path (564) may be at least partially external to the cylinder (557) as shown. Alternatively, the fluid communication path (564) may be disposed in the piston (555). The reaction chamber portion (560) of the cylinder (557) may contain a catalyst for increasing the rate of reaction of the chemical solution. The fluid communication path (564) may also include a control valve such as a microvalve (566) to meter the chemical solution from the chemical solution reservoir portion (556) of the cylinder (557) to the reaction chamber portion (560). As the supply of aqueous sodium borohydride is transferred from the chemical solution reservoir portion (556) of the cylinder (557) to the reaction chamber portion (560), the spring (558) moves the piston (555) toward the chemical solution reservoir portion (556) and the volume of the chemical solution reservoir portion (556) decreases. As the volume of the chemical solution reservoir portion (556) of the cylinder (557) decreases, more of the cylinder (557) volume may be used for the reaction chamber portion (560). Hydrogen produced in the reaction chamber portion (560) of the cylinder (557) may be provided to an anode of a fuel cell apparatus such as the apparatus described with reference to FIGS. 1 and 2.

It will be appreciated by those of skill in the art having the benefit of this disclosure that the embodiments described advantageously provide for metering of a hydrogen-bearing fuel source to a chemical reaction chamber in an orientation-independent manner. That is, the hydrogen generating apparatus (54, 154, etc.) may be operable in any orientation because the pressure producing members provide a pressure differential between the chemical solution reservoirs (56, 156, etc.) and the chemical reaction chambers (60, 160, etc.) in any orientation. This may be especially important for fuel cell applications in portable electronics—which are often moved and reoriented in many different ways. In addition, some embodiments of the present invention may use only a single control valve (66, 166, etc.), reducing the occurrence of failures present in prior hydrogen generating systems that require pumps and multiple control valves. Each of the embodiments shown in FIGS. 3-8 may also be implemented in hydrogen generating cartridges that are independent and separate from—but may be coupled to—a fuel cell apparatus.

Figure 9:
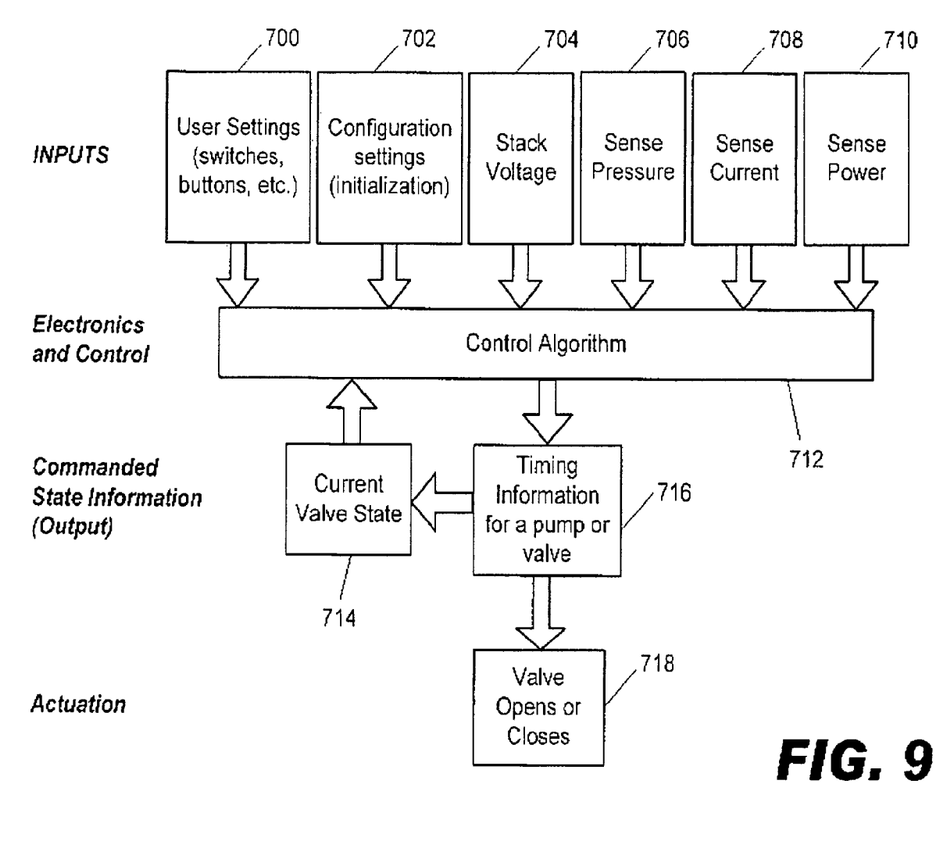
FIG. 9 is a conceptual diagram of a control structure for a hydrogen generator according to an embodiment of the present invention.

Each of the embodiments described above preferably include a control valve to meter the transfer of a chemical solution, such as sodium borohydride, from a chemical reservoir to a reaction chamber. Control of the hydrogen generation is facilitated by the control valve (such as the microvalves described above). Referring next to FIG. 9, a diagram of a control scheme for the hydrogen generating apparatus according to one embodiment of the present invention is shown. The inputs to the control scheme may include, but are not limited to, user settings (700), configuration settings (702), fuel cell stack voltage (704), reservoir, hydrogen gas, and/or reactor pressure (706), fuel cell current (708), and fuel cell power (710).

The user settings (700) may include switches, buttons, and the like that a user may operate to control the state of the control valve directly. The configuration settings (702) may include an initialization routine to initialize the control scheme and set operating parameters. It will be appreciated that one or more of the inputs (700-710) may be fed into a control algorithm (712) to control the hydrogen generating apparatus. The control algorithm may include all the necessary programming and electronics to receive input, analyze the input received, and provide appropriate and corresponding control signals to the control valve. The control algorithm may thus include a digital electronic controller, an analog electronic controller, or a mechanical controller. The control algorithm may use any or all of the inputs (700-710) to issue command state information (output). The command state information may include the current valve state (714) indicative of valve position (open/closed), and/or timing information (716) indicating valve operating frequency. Depending on the control algorithm output, the control valve may be opened or closed (718) to control the flow of chemical solution from a reservoir to a reaction chamber, and thus the rate of hydrogen production.

Figure 10:
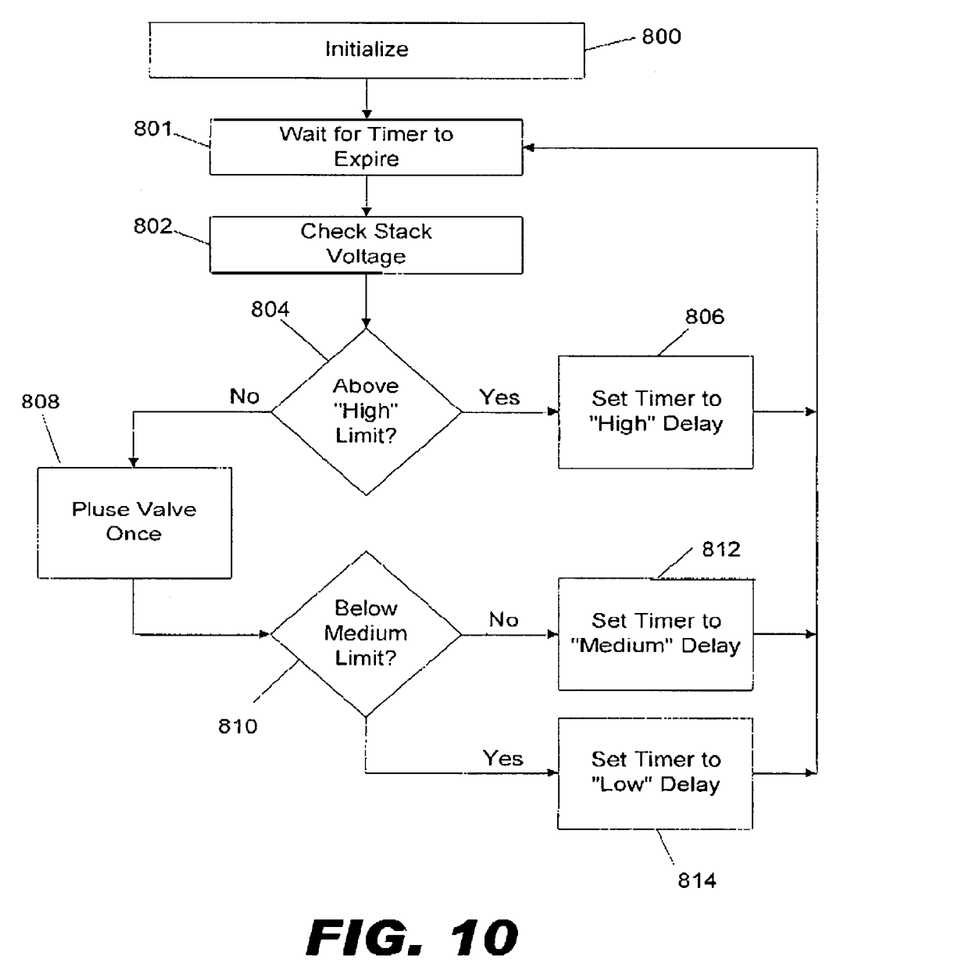
FIG. 10 is a flow diagram for a control algorithm for a hydrogen generator according to an embodiment of the present invention.

One example of a control algorithm that may be used as part of the control scheme is shown in FIG. 10, however, it will be understood that many other and/or additional control algorithms may be used by those of skill in the art having the benefit of this disclosure to meet individual needs and that FIG. 10 is merely an example. For example a production controller could vary the pulse width and/or the aperture size of a control valve in addition to the changing the frequency the valve is opened. Furthermore, a battery, capacitor, or other energy storage device could be added to the system (as shown in FIG. 2) to de-couple the fuel cell from the load to keep the fuel cell operating at its most efficient rate.

According to the exemplary embodiment of FIG. 10, the control algorithm may initialize (800) and wait for a timer to expire (801), then check for fuel cell stack voltage (802). In some embodiments, however, there is no timer. If the fuel cell stack voltage is above a predetermined "High" limit (804), the control algorithm progresses to set a valve timer to a "High" delay frequency (806) and the stack voltage is continually or, in embodiments with a timer, periodically checked again (802) after expiration of a timer (801). If the fuel cell stack voltage is not above the predetermined "High" limit (804), the control valve is pulsed once (808) and the algorithm checks for fuel cell stack voltage below a "Medium" limit (810). If the fuel cell stack voltage is not below the "Medium" limit (810), the valve timer is set to a "Medium" delay frequency (812) and the stack voltage is continually or, in embodiments with a timer, periodically checked again (802) after the expiration of a timer (801). If, however, the fuel cell stack voltage is below the "Medium" limit, the valve timer is set to a "Low" delay frequency (814) and the stack voltage is continually or periodically checked again (802).

The preceding description has been presented only to illustrate and describe the invention. It is not intended to be exhaustive or to limit the invention to any precise form disclosed. Many modifications and variations are possible in light of the above teaching.

The embodiments shown were chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A hydrogen generating apparatus comprising:
   a chemical reaction chamber;
   a chemical solution reservoir comprising a spring bag; and
   said spring-bag for providing pressure to move a chemical solution from said chemical solution reservoir to said chemical reaction chamber where hydrogen is produced from said chemical solution;
   wherein said chemical solution reservoir is contained by said chemical reaction chamber.

2. The apparatus of claim 1, wherein said chemical reaction chamber is rigid.

3. The apparatus of claim 1, wherein said spring-bag comprises a spring adjacent to a flexible bag, wherein said spring is configured to apply pressure to said flexible bag.

4. The apparatus of claim 3, further comprising a plate disposed between said spring and said flexible bag.

5. The apparatus of claim 1, wherein said spring-bag comprises an elastomer such that said spring-bag naturally contracts when inflated beyond a rest volume to apply said pressure to move said chemical solution.

6. An electrical current generating apparatus comprising the hydrogen generating apparatus of claim 1, said electrical current generating apparatus comprising:
   a fuel cell; and
   said hydrogen generating apparatus comprising said spring-bag, said hydrogen generating apparatus being connected to said fuel cell for providing hydrogen gas to said fuel cell.

7. The apparatus of claim 6, wherein said chemical solution reservoir is maintained at a pressure greater than a pressure in said reaction chamber by a biasing force applied to said chemical solution reservoir.

8. The apparatus of claim 7, wherein the biasing force is provided by a spring.

9. The apparatus of claim 8, wherein said spring is in direct contact with said chemical solution reservoir.

10. The apparatus of claim 8, wherein said spring supplies said biasing force to said chemical solution reservoir indirectly.

11. The apparatus of claim 10, further comprising a pressure plate disposed between said chemical solution reservoir and said spring.

12. The apparatus of claim 6, further comprising a mixture of aqueous sodium borohydride disposed in said chemical solution reservoir and a catalyst disposed in said reaction chamber.

13. The apparatus of claim 6, further comprising a fluid communication path between said chemical solution reservoir and said reaction chamber, wherein a control valve is disposed along said fluid communication path.

14. A fuel cell apparatus comprising:
an anode;
a cathode;
an electrolyte disposed between said anode and said cathode;
a hydrogen generating apparatus according to claim 1.

15. A hydrogen generating apparatus comprising:
a chemical reaction chamber;
a chemical solution reservoir comprising a spring bag; and
said spring-bag for providing pressure to move a chemical solution from said chemical solution reservoir to said chemical reaction chamber where hydrogen is produced from said chemical solution;
wherein said chemical reaction chamber comprises a flexible bag.

16. The apparatus of claim 15, wherein said spring-bag comprises a spring adjacent to a flexible bag, wherein said spring is configured to apply pressure to said flexible bag.

17. The apparatus of claim 16, further comprising a plate disposed between said spring and said flexible bag.

18. The apparatus of claim 15, wherein said spring-bag comprises an elastomer such that said spring-bag naturally contracts when inflated beyond a rest volume to apply said pressure to move said chemical solution.

19. An electrical current generating apparatus comprising the hydrogen generating apparatus of claim 15, said electrical current generating apparatus comprising:
a fuel cell; and
said hydrogen generating apparatus comprising said spring-bag, said hydrogen generating apparatus being connected to said fuel cell for providing hydrogen gas to said fuel cell.

20. The apparatus of claim 19, wherein said chemical solution reservoir is disposed within said chemical reaction chamber.

21. The apparatus of claim 20, wherein said chemical solution reservoir is maintained at a pressure greater than a pressure in said reaction chamber by a biasing force applied to said chemical solution reservoir.

22. The apparatus of claim 21, wherein the biasing force is provided by a spring.

23. The apparatus of claim 22, wherein said spring is in direct contact with said chemical solution reservoir.

24. The apparatus of claim 22, wherein said spring supplies said biasing force to said chemical solution reservoir indirectly.

25. The apparatus of claim 24, further comprising a pressure plate disposed between said chemical solution reservoir and said spring.

26. The apparatus of claim 20, further comprising a mixture of aqueous sodium borohydride disposed in said chemical solution reservoir and a catalyst disposed in said reaction chamber.

27. The apparatus of claim 20, further comprising a fluid communication path between said chemical solution reservoir and said reaction chamber, wherein a control valve is disposed along said fluid communication path.

28. A fuel cell apparatus comprising:
an anode;
a cathode;
an electrolyte disposed between said anode and said cathode;
a hydrogen generating apparatus according to claim 15.

29. A hydrogen generating apparatus comprising:
a chemical reaction chamber;
a chemical solution reservoir comprising a spring bag; and
said spring-bag for providing pressure to move a chemical solution from said chemical solution reservoir to said chemical reaction chamber where hydrogen is produced from said chemical solution;
wherein said spring-bag comprises a flexible bag that is both flexible and made of a stretchable material that is biased to a particular volume, said flexible bag being inflated with a liquid chemical solution pumped under pressure into said flexible bag, to expand said flexible bag beyond said particular volume, said flexible bag then providing pressure from all directions when so expanded so as to move a chemical solution from said chemical solution reservoir to said chemical reaction chamber where hydrogen is produced from said chemical solution.

30. The apparatus of claim 29, wherein said flexible bag comprises an elastomer.

31. The apparatus of claim 29, wherein said flexible bag comprises rubber.

* * * * *